United States Patent
Kao et al.

(10) Patent No.: US 7,955,737 B2
(45) Date of Patent: *Jun. 7, 2011

(54) BATTERY GRID

(75) Inventors: Wen-Hong Kao, Brown Deer, WI (US);
Shu Jen F. Kao, legal representative,
Brown Deer, WI (US); **Glenn W.
Andersen, Hartford, WI (US); Eric M.
Taylor, Shorewood, WI (US); Kenneth
A. Adams**, Germantown, WI (US);
Edward N. Mrotek, Grafton, WI (US);
Jeffrey P. Zagrodnik, Hales Corners,
WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,803

(22) Filed: Jun. 25, 2010

(65) Prior Publication Data

US 2010/0266903 A1 Oct. 21, 2010

Related U.S. Application Data

(63) Continuation of application No. 11/984,666, filed on Nov. 20, 2007, now Pat. No. 7,767,347.

(51) Int. Cl.
H01M 4/74 (2006.01)
(52) U.S. Cl. .................................................. 429/241
(58) Field of Classification Search .................. 429/233, 429/241, 243, 244
See application file for complete search history.

(56) References Cited

U.S. PATENT DOCUMENTS

| 345,511 A | 7/1886 | Khotinsky |
| 487,834 A | 12/1892 | Griscom |
| 669,085 A | 3/1901 | Heidel |
| 1,129,690 A | 2/1915 | Knobloch |
| 1,500,219 A | 7/1924 | Benner |
| 1,524,610 A | 1/1925 | Ahlgren |
| 1,600,083 A | 9/1926 | Webster |
| 1,947,473 A | 2/1934 | Huebner |
| 1,983,611 A | 12/1934 | Jackson |
| 2,060,534 A | 11/1936 | Singleton et al. |
| 2,079,727 A | 5/1937 | Wirtz |

(Continued)

FOREIGN PATENT DOCUMENTS

EP 0029788 11/1980

(Continued)

OTHER PUBLICATIONS

Patent Abstract for AU 275685.

(Continued)

*Primary Examiner* — Ula C. Ruddock
*Assistant Examiner* — Thomas H. Parsons
(74) *Attorney, Agent, or Firm* — Lathrop & Clark LLP

(57) ABSTRACT

A battery grid includes a frame that includes a top element, a bottom element, a first side element, and a second side element. The battery grid also includes a plurality of wires provided within the frame and defining a plurality of open areas and a current collection lug extending from the top element in a first direction. The battery grid further includes at least one feature provided in the battery grid that is configured to reduce the amount of growth of the battery grid in the first direction due to corrosion of the battery grid during the life of the battery grid.

11 Claims, 4 Drawing Sheets

U.S. PATENT DOCUMENTS

| | | |
|---|---|---|
| 2,148,371 A | 2/1939 | Galloway |
| 2,193,782 A | 3/1940 | Smith |
| 2,261,053 A | 10/1941 | De Martis et al. |
| 2,282,760 A | 5/1942 | Hauel |
| 2,503,970 A | 4/1950 | Rupp |
| 2,727,079 A | 12/1955 | Chubb et al. |
| 2,881,105 A | 4/1959 | Gullett |
| 2,882,568 A | 4/1959 | Leaberry et al. |
| 3,009,459 A | 11/1961 | Ruben |
| 3,023,468 A | 3/1962 | Hord et al. |
| 3,249,981 A | 5/1966 | Sabatino |
| 3,349,067 A | 10/1967 | Hill et al. |
| 3,398,024 A | 8/1968 | Barnes et al. |
| 3,408,236 A | 10/1968 | Hartesveldt |
| 3,466,193 A | 9/1969 | Hughel |
| 3,486,942 A | 12/1969 | Hatterschide |
| 3,534,803 A | 10/1970 | Bickerdike et al. |
| 3,556,853 A | 1/1971 | Cannone |
| 3,556,854 A | 1/1971 | Wheadon et al. |
| 3,579,386 A | 5/1971 | Tiegel et al. |
| 3,629,388 A | 12/1971 | Wolf et al. |
| 3,710,430 A | 1/1973 | Long et al. |
| 3,723,181 A | 3/1973 | Oakley |
| 3,761,047 A | 9/1973 | Mao |
| 3,779,816 A | 12/1973 | Mao |
| 3,909,293 A | 9/1975 | Hammond et al. |
| 3,923,545 A | 12/1975 | Margulies et al. |
| 3,926,247 A | 12/1975 | Geiger et al. |
| 3,929,513 A | 12/1975 | Mao |
| 3,933,335 A | 1/1976 | Maruyama et al. |
| 3,933,524 A | 1/1976 | Hughel et al. |
| 3,945,097 A | 3/1976 | Daniels, Jr. et al. |
| 3,947,936 A | 4/1976 | Wheadon |
| 3,959,016 A | 5/1976 | Tsuda |
| 3,989,539 A | 11/1976 | Grabb |
| 4,016,633 A | 4/1977 | Smith et al. |
| 4,022,951 A | 5/1977 | McDowall |
| 4,048,397 A | 9/1977 | Rothbauer |
| 4,050,502 A | 9/1977 | Allyn et al. |
| 4,080,727 A | 3/1978 | Stolle et al. |
| 4,097,625 A | 6/1978 | Lunn et al. |
| 4,107,407 A | 8/1978 | Koch |
| 4,118,553 A | 10/1978 | Buckethal et al. |
| 4,140,840 A | 2/1979 | Ruben |
| 4,151,331 A | 4/1979 | Hug et al. |
| 4,189,533 A | 2/1980 | Sugalski |
| 4,193,769 A | 3/1980 | Cheng et al. |
| 4,196,757 A | 4/1980 | Hug et al. |
| 4,199,849 A | 4/1980 | Moreau |
| 4,221,032 A | 9/1980 | Cousino et al. |
| 4,221,852 A | 9/1980 | Qureshi |
| 4,291,443 A | 9/1981 | Laurie et al. |
| 4,297,866 A | 11/1981 | Sakauye et al. |
| 4,303,747 A | 12/1981 | Bender |
| 4,305,187 A | 12/1981 | Iwamura et al. |
| 4,315,356 A | 2/1982 | Laurie et al. |
| 4,315,829 A | 2/1982 | Duddy et al. |
| 4,317,351 A | 3/1982 | Borrows |
| 4,320,183 A | 3/1982 | Qureshi |
| 4,327,163 A | 4/1982 | Wheadon |
| 4,345,452 A | 8/1982 | Eberle |
| 4,349,067 A | 9/1982 | Wirtz et al. |
| 4,351,891 A | 9/1982 | McCartney, Jr. et al. |
| 4,353,969 A | 10/1982 | Rippel et al. |
| 4,358,892 A | 11/1982 | Turillon et al. |
| 4,386,987 A | 6/1983 | Covitch et al. |
| 4,407,063 A | 10/1983 | Johnson |
| 4,443,918 A | 4/1984 | Morinari et al. |
| 4,455,724 A | 6/1984 | Sperling et al. |
| 4,460,666 A | 7/1984 | Dinkler et al. |
| 4,462,745 A | 7/1984 | Johnson et al. |
| 4,477,546 A | 10/1984 | Wheeler et al. |
| 4,498,519 A | 2/1985 | Watanabe et al. |
| 4,528,255 A | 7/1985 | Hayes et al. |
| 4,548,882 A | 10/1985 | Shima et al. |
| 4,555,459 A | 11/1985 | Anderson et al. |
| 4,606,383 A | 8/1986 | Yanik |
| 4,614,630 A | 9/1986 | Pluim, Jr. |
| 4,629,516 A | 12/1986 | Myers |
| 4,683,180 A | 7/1987 | Bish et al. |
| 4,758,126 A | 7/1988 | Johnson et al. |
| 4,761,352 A | 8/1988 | Bakos et al. |
| 4,761,356 A | 8/1988 | Kobayashi et al. |
| 4,782,585 A | 11/1988 | Kobayashi et al. |
| 4,805,277 A | 2/1989 | Yasuda et al. |
| 4,822,234 A | 4/1989 | Johnson et al. |
| 4,824,307 A | 4/1989 | Johnson et al. |
| 4,830,938 A | 5/1989 | McCullough et al. |
| 4,865,928 A | 9/1989 | Richter |
| 4,865,933 A | 9/1989 | Blanyer et al. |
| 4,882,234 A | 11/1989 | Lai et al. |
| 4,882,828 A | 11/1989 | McLoughlin et al. |
| 4,906,540 A | 3/1990 | Hoshihara et al. |
| 4,939,051 A | 7/1990 | Yasuda et al. |
| 4,982,482 A | 1/1991 | Wheadon et al. |
| 5,017,446 A | 5/1991 | Reichman et al. |
| 5,024,908 A | 6/1991 | Terada et al. |
| 5,093,970 A | 3/1992 | Senoo et al. |
| 5,098,799 A | 3/1992 | Bowen et al. |
| 5,149,605 A | 9/1992 | Dougherty |
| 5,221,852 A | 6/1993 | Nagai et al. |
| 5,223,354 A | 6/1993 | Senoo et al. |
| 5,264,306 A | 11/1993 | Walker, Jr. et al. |
| 5,273,554 A | 12/1993 | Vyas |
| 5,308,719 A | 5/1994 | Mrotek et al. |
| 5,344,727 A | 9/1994 | Meadows et al. |
| 5,350,645 A | 9/1994 | Lake et al. |
| 5,384,217 A | 1/1995 | Binder et al. |
| 5,384,219 A | 1/1995 | Dao et al. |
| 5,434,025 A | 7/1995 | Rao et al. |
| 5,462,109 A | 10/1995 | Vincze et al. |
| 5,506,062 A | 4/1996 | Flammang |
| 5,540,127 A | 7/1996 | Binder et al. |
| 5,543,250 A | 8/1996 | Yanagihara et al. |
| 5,578,398 A | 11/1996 | Jenkins et al. |
| 5,578,840 A | 11/1996 | Scepanovic et al. |
| 5,580,685 A | 12/1996 | Schenk |
| 5,582,936 A | 12/1996 | Mrotek et al. |
| 5,595,840 A | 1/1997 | Henning et al. |
| 5,601,953 A | 2/1997 | Schenk |
| 5,611,128 A | 3/1997 | Wirtz |
| 5,643,696 A | 7/1997 | Rowlette |
| 5,660,600 A | 8/1997 | Vyas |
| 5,691,087 A | 11/1997 | Rao et al. |
| 5,851,695 A | 12/1998 | Misra et al. |
| 5,858,575 A | 1/1999 | Chen |
| 5,874,186 A | 2/1999 | Rao et al. |
| 5,948,566 A | 9/1999 | Larsen et al. |
| 5,952,123 A | 9/1999 | Hatanaka et al. |
| 5,958,625 A | 9/1999 | Rao |
| 5,989,749 A | 11/1999 | Kao et al. |
| 6,037,081 A | 3/2000 | Kashio et al. |
| 6,057,059 A | 5/2000 | Kwok et al. |
| 6,086,691 A | 7/2000 | Lehockey et al. |
| 6,117,594 A | 9/2000 | Taylor et al. |
| 6,122,820 A | 9/2000 | Dawood et al. |
| 6,180,286 B1 | 1/2001 | Rao et al. |
| 6,203,948 B1 | 3/2001 | Kao et al. |
| 6,245,462 B1 | 6/2001 | Kao et al. |
| 6,274,274 B1 | 8/2001 | Schaeffer et al. |
| 6,291,097 B1 | 9/2001 | Barker et al. |
| 6,342,110 B1 | 1/2002 | Palumbo |
| 6,419,712 B1 | 7/2002 | Haverstick |
| 6,442,811 B1 | 9/2002 | Dawood et al. |
| 6,444,366 B1 | 9/2002 | Kawano et al. |
| 6,454,977 B1 | 9/2002 | Kwok et al. |
| 6,468,318 B1 | 10/2002 | Meadows et al. |
| 6,582,855 B1 | 6/2003 | Miyamoto et al. |
| 6,749,950 B2 | 6/2004 | Zhang |
| 6,755,874 B2 | 6/2004 | Chen et al. |
| 6,833,218 B2 | 12/2004 | Mann |
| 6,921,611 B2 | 7/2005 | Schaeffer et al. |
| 6,953,641 B2 | 10/2005 | Chen |
| 7,767,347 B2 * | 8/2010 | Kao et al. ............... 429/244 |
| 2002/0088515 A1 | 7/2002 | Aust et al. |
| 2003/0059674 A1 | 3/2003 | Mann et al. |
| 2004/0187986 A1 | 9/2004 | Schaeffer |

| | | | |
|---|---|---|---|
| 2005/0112470 | A1 | 5/2005 | Taylor et al. |
| 2005/0150092 | A1 | 7/2005 | Chen |
| 2005/0164091 | A1 | 7/2005 | Schaeffer et al. |

FOREIGN PATENT DOCUMENTS

| | | |
|---|---|---|
| EP | 0065996 | 5/1981 |
| EP | 0348702 | 1/1990 |
| EP | 0589549 | 3/1994 |
| EP | 0795917 A2 | 9/1997 |
| GB | 570953 | 7/1945 |
| GB | 1377039 | 5/1973 |
| GB | 2127614 A | 7/1983 |
| GB | 2170343 | 7/1986 |
| JP | 55046267 | 3/1980 |
| JP | 55130076 | 10/1980 |
| JP | 55144659 | 11/1980 |
| JP | 56032678 | 4/1981 |
| JP | 56107474 | 8/1981 |
| JP | 56138871 | 10/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |
| JP | 58075772 | 5/1983 |
| JP | 59134563 | 8/1984 |
| JP | 60000062 | 1/1985 |
| JP | 60009061 | 1/1985 |
| JP | 60037663 | 2/1985 |
| JP | 60039766 | 3/1985 |
| JP | 60143570 | 7/1985 |
| JP | 60150556 | 8/1985 |
| JP | 60167267 | 8/1985 |
| JP | 60167268 | 8/1985 |
| JP | 60198055 | 10/1985 |
| JP | 61124052 | 6/1986 |
| JP | 63213264 | 9/1988 |
| JP | 1030168 | 2/1989 |
| JP | 2297864 | 12/1990 |
| JP | 3030260 | 2/1991 |
| JP | 3245462 | 11/1991 |
| JP | 5036416 | 2/1993 |
| JP | 5275081 | 10/1993 |
| JP | 8083617 | 3/1996 |
| JP | 8287905 | 11/1996 |
| JP | 11054115 | 2/1999 |
| JP | 2001229920 | 8/2001 |
| WO | WO 99/27595 | 6/1999 |
| WO | WO 01/04977 | 1/2001 |
| WO | WO 02/054513 A2 | 7/2002 |

OTHER PUBLICATIONS

Patent Abstract for JP 10-284085: publication date Oct. 23, 1998.
PCT Search Report dated Oct. 9, 2000 for PCT/US00/18114.
International Search Report dated Aug. 19, 2002 for PCT/US02/00390, 7 pages.
Office Action dated May 1, 2003 for U.S. Appl. No. 09/898,660.
Office Action dated Mar. 24, 2003 for U.S. Appl. No. 09/898,660.
U.S. Appl. No. 09/898,660, titled "Modification of the Shape/Surface Finish of Battery Grid Wires to Improve Paste Adhesion," by Schaeffer et al., filed Jul. 2, 2001. Ishikawa et al., "A punched grid production process for automotive batteries" from Pb 80, 7$^{th}$ International Conference (1980).
Perez, *The Complete Battery Book*, TAB Books, Inc., 191 pp., 1985 (no. month).
PCT Search Report Aug. 11, 2000 for PCT/US00/12569.
S. Goodman, "Plates with improved conductivity," *Batteries International*, pp. 88-89, 1994 (July).
Non-Final Office Action dated Nov. 19, 2003 from U.S. Appl. No. 09/755,337.
Reply and Amendment dated Feb. 12, 2004 from U.S. Appl. No. 09/755,337.
Final Office Action dated May 19, 2004 from U.S. Appl. No. 09/755,337.
Reply and Amendment dated Jul. 19, 2004 from U.S. Appl. No. 09/755,337.
Office Action dated Jan. 7, 2003 for U.S. Appl. No. 09/755,337.
Office Action dated Jun. 18, 2003 for U.S. Appl. No. 09/755,337.
Office Action dated Sep. 16, 2002 for U.S. Appl. No. 09/755,337.
U.S. Appl. No. 09/755,337, titled "Method For Making an Alloy Coated Battery Grid," by Yu-Lin Chen.
Ishikawa et al., "A punched grid production process for automotive batteries" from Pb 80, 7$^{th}$ International Conference.
PCT Search Report dated Oct. 6, 1999 in PCT/US99/13291.
International Search Report and Written Opinion dated Oct. 5, 2006 for International Application No. PCT/US2006/019686, 2 pages.
Response dated May 28, 2009 to Office Action for European Patent Application No. 06 770 804.0-2119, 9 pages.
Office Action dated Jan. 21, 2009 for European Patent Application No. 06 770 804.0-2119, 3 pages.
Office Action dated Apr. 23, 2008 for European Patent Application No. 06 770 804.0-2119, 5 pages.
Response dated Oct. 28, 2008 to Office Action for European Patent Application No. 06 770 804.0-2119, 9 pages.
Chinese Patent Office, Office Action (with English Translation) dated Jul. 6, 2009 for Chinese Patent Application No. 200680017715.1 based on PCT/US2006/019686, 12 pages.

* cited by examiner

BATTERY GRID

CROSS-REFERENCE TO RELATED APPLICATIONS

This application is a continuation application of U.S. application Ser. No. 11/984,666, filed Nov. 20, 2007, which is national stage application of International Application No. PCT/US2006/019686, which has an international filing date of May 22, 2006, which claims the benefit of U.S. Provisional Patent Application No. 60/683,608 filed May 23, 2005, the entire disclosure of which is incorporated by reference herein.

BACKGROUND

The present inventions relate to grids for use in batteries (e.g., lead-acid batteries such as batteries for vehicle starting, lighting, and ignition applications; marine batteries; commercial batteries; industrial batteries; batteries for use with hybrid-electric vehicles; etc.). More specifically, the present inventions relate to grids that have a configuration which resists shorting of a battery cell due to growth of the grids.

Lead-acid batteries conventionally include a number of cells in which energy is stored. For example, a 12 volt battery may include six cells, each of which provides 2 volts. Each of the cells includes one or more positive electrodes or plates and one or more negative electrodes or plates. An electrolyte (e.g., acid such as dilute sulfuric acid) is also provided in the cells to facilitate chemical reactions which take place in the cells during charging and discharging of the battery.

The positive and negative electrodes each comprise a grid made from lead or a lead alloy (e.g., a lead-calcium alloy) on which an active material in the form of a paste is provided. Such grids include a plurality of wires coupled to a plurality of nodes (e.g., a battery grid may include a frame comprising four sides with a lug or current collector extending from one of the sides and a network of wires or grid elements interconnected with a plurality of nodes).

The positive and negative electrodes are arranged in each of the cells in alternating fashion and are separated from adjacent plates by a separator (e.g., a microporous polymeric separator). For example, the negative electrodes may be contained within a separator envelope to electrically isolate them from adjacent positive electrodes. In this manner, the positive and negative electrodes are prevented from coming into direct contact with each other, which would cause a short in the cell.

Over an extended period of use, the grids will corrode, which in turn will cause the grids to grow. By way of illustration, FIG. 1 shows a cell having a first electrode 10 (e.g., a positive electrode) with a current collector 12 arranged adjacent a second electrode (e.g., a negative electrode, partially obscured by electrode 10 in FIG. 1) with a current collector 22. The current collector 12 of the positive electrode is electrically coupled to other positive electrodes in the cell by a strap or connector 14, while the current collector 22 of the negative electrode is electrically coupled to other negative electrodes in the cell by a strap or connector 24. The positive strap in a cell is then connected to a negative strap in the next cell.

Growth of positive electrode 10 is illustrated by dashed lines 30 and 32. When installed in a battery container, the grids are generally constrained on their sides and bottom by walls of the battery container. Accordingly, growth of the grids generally occurs along the top surface of the grids. In certain situations, such unconstrained growth in the positive vertical direction may cause a short of the cell. For example, as shown in FIG. 1, the growth of the positive grid illustrated by dashed line 32 results in a portion of the grid coming into contact with strap 24 that is connected to the negative electrodes. In such a situation, the positive and negative electrodes are electrically coupled together, which may act to short the cell. Thus, while adjacent positive and negative electrodes may be separated from each other with a polymeric separator, shorting may still occur due to corrosion of the grids which causes growth in the vertical direction.

While it is known to provide grids for use in batteries, such known grid configurations do not provide certain advantageous features and/or combinations of features.

SUMMARY

An embodiment of the present invention relates to a battery grid that includes a frame that includes a top element, a bottom element, a first side element, and a second side element. The battery grid also includes a plurality of wires provided within the frame and defining a plurality of open areas and a current collection lug extending from the top element in a first direction. The battery grid further includes at least one feature provided in the battery grid that is configured to reduce the amount of growth of the battery grid in the first direction due to corrosion of the battery grid during the life of the battery grid.

DETAILED DESCRIPTION

Figure 2:
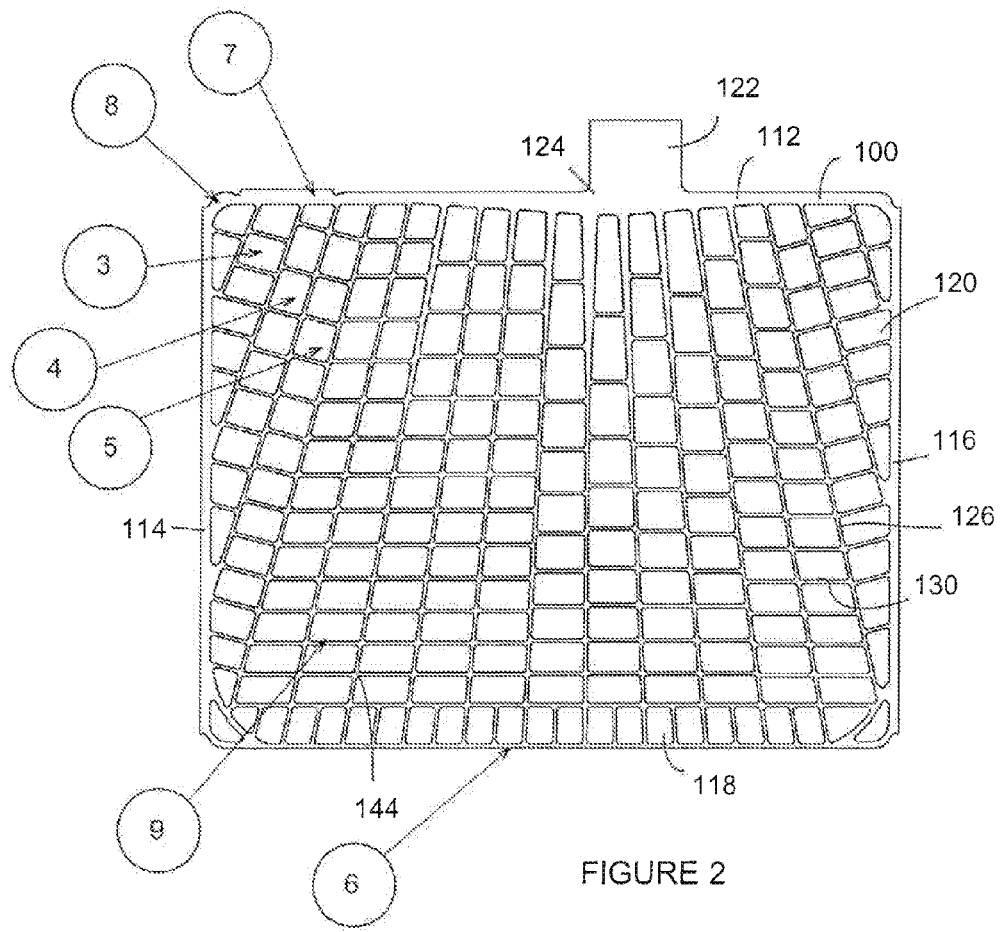
FIG. 2 is a plan view of a battery grid according to an exemplary embodiment.

FIG. 2 illustrates a battery grid 100 according to an exemplary embodiment. Grid 100 may be either a positive or a negative grid, and may be produced by any known method (e.g., by casting, by expansion of a sheet of material after piercing the sheet, by a progressive punching operation, etc.) using any known materials (e.g., lead or lead alloys, such as lead-calcium alloys, etc.). Various nonexclusive examples of battery grids that may be used in accordance with the present disclosure are shown, for example, in the following U.S. patents, the disclosures of which are hereby incorporated by reference: U.S. Pat. No. 5,582,936; U.S. Pat. No. 5,989,749; U.S. Pat. No. 6,203,948; U.S. Pat. No. 6,245,462; and U.S. Pat. No. 6,274,274.

Referring to FIG. 2, grid 100 comprises a frame that includes a top frame element 112, first and second side frame elements 114 and 116, and a bottom frame element 118. The grid 100 includes a series of grid wires that define open areas 120 that hold electrochemically active paste (not shown) that provides the current generation for a battery. A current collector or lug 122 is integral with the top frame element 112 and is offset from the center of the top frame element 112. The top frame element 112 includes an enlarged conductive section 124 directly beneath the lug 122, and has the shape shown to optimize current conduction to the lug 122.

A series of radially extending vertical grid wire elements 126 form part of the grid 100. The vertical wire elements 126 are connected to the top frame element 112 and at least one of the bottom frame element 118, the first side frame element 114, and the second side frame element 116. The vertical wire elements 126 become closer together when moving from the bottom element 118 towards the top element 112 and get farther apart when moving towards the left element 114 or the right element 116.

The grid 100 also includes a plurality of horizontal or cross wire elements 130. Individual sections of the vertical wire elements 126 and the horizontal wire elements 130 ends which are joined at a plurality of nodes 144 that define the open areas 120 that support the electrochemically active paste for conduction.

Figure 1:
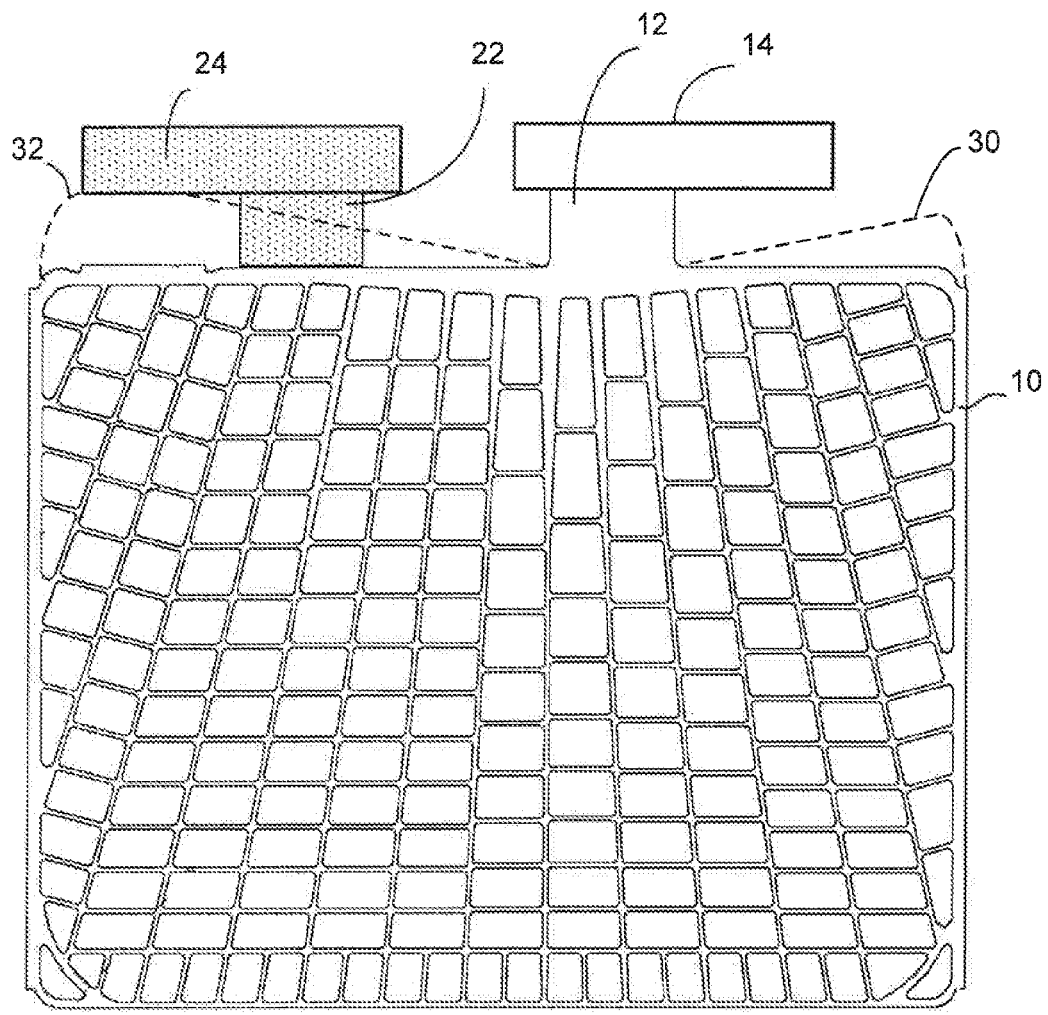
FIG. 1 illustrates the growth of a battery grid due to corrosion which may result in shorting of a battery cell.
Figure 3:
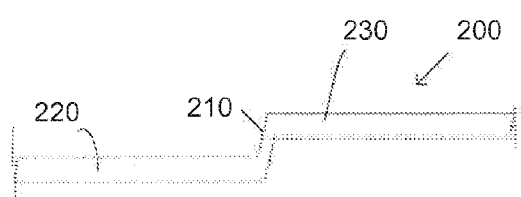
FIG. 3 is a plan view of a portion of a battery grid similar to that shown in FIG. 2 that includes a modified configuration that is intended to restrain the overall growth of the grid due to corrosion.

FIGS. 3-9 illustrate various modifications to the grid shown in FIG. 1 that are intended to retard, restrict, or restrain growth of the grid 100 when the grid 100 corrodes during its useful life in a battery. The circled numbers shown in FIG. 2 reflect the location on the grid 100 where the various modifications are to be made (e.g., the modification shown in FIG. 3 is designated by the circled number 3 in FIG. 2).

As shown in FIG. 3, a "weak link" may be provided for one of the horizontal or vertical wire elements. For example, according to an exemplary embodiment, a first portion or segment 220 of a wire 200 may be joined to a second portion or segment 230 of the wire 200 by a portion or segment 210 that is configured to break when a threshold amount of stress is applied to the wire 200. When growth of the grid 100 causes movement of the first portion 210 relative to the second portion 230, the middle portion 210 will break, which may act to interrupt the growth of the grid at this point. As shown in FIG. 3, middle portion 210 is provided to connect portion 220 to portion 230 such that portion 220 is "staggered" relative to portion 230. According to various exemplary embodiments, any suitable number of weak links may be provided in the grid to redirect the stresses caused by growth of the grid due to corrosion, and they may be provided for both vertical and horizontal wires as may be desired.

Figure 4:
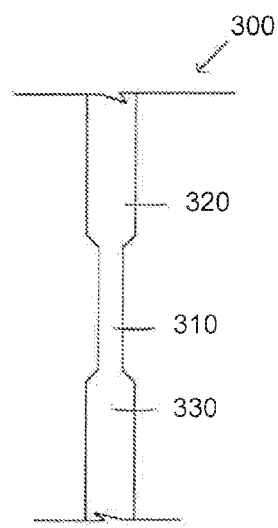
FIG. 4 is a plan view of a portion of a battery grid similar to that shown in FIG. 2 that includes a modified configuration that is intended to restrain the overall growth of the grid due to corrosion.

As shown in FIG. 4, one or more of the vertical and horizontal wires may be configured to act as a fuse that is intended to break when a threshold amount of stress is applied or to corrode away at a given time of the battery life. According to an exemplary embodiment shown in FIG. 4, a wire 300 may include a first portion or segment 320 and a second portion or segment 330 connected by a relatively thin portion or segment 310 (e.g., portion 310 has a smaller cross-sectional area and/or a different cross-sectional shape as compared to the remainder of wire 300). When growth of the grid occurs as a result of corrosion, a tensile stress may be applied to the wire 310. Because the portion 310 has a smaller cross-sectional area than that of portions 320 and 330, the wire 300 will break in the portion 310 if a sufficient degree of stress is applied or will corrode away. Such breakage may act to interrupt the growth of the grid at this point. According to various exemplary embodiments, any suitable number of horizontal or vertical wires may be provided in the grid as may be desired, and any of a variety of configurations may be provided for the fuse.

Figure 5:
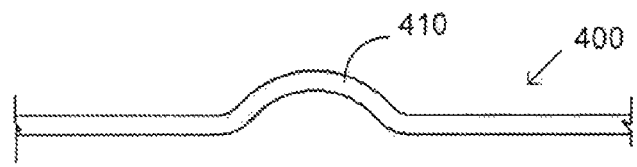
FIG. 5 is a plan view of a portion of a battery grid similar to that shown in FIG. 2 that includes a modified configuration that is intended to restrain the overall growth of the grid due to corrosion.

As shown in FIG. 5, a distortion may be provided in one or more of the wires that is intended to absorb or redirect a portion of the stress resulting from the growth of the grid. According to an exemplary embodiment shown in FIG. 5, a rounded feature 410 may be provided in a wire 400. When the grid experiences growth due to corrosion, the shape of the wire 400 may be altered. The inclusion of a distortion (e.g., rounded portion 410) may deflect some of the growth (e.g., by providing something other than a straight line for growth). In this manner, the growth of the grid may be interrupted at this point. According to various exemplary embodiments, any suitable number of vertical or horizontal wires having distortions may be provided in the grid, and any of a variety of configurations may be used for the one or more distortions.

Figure 6:
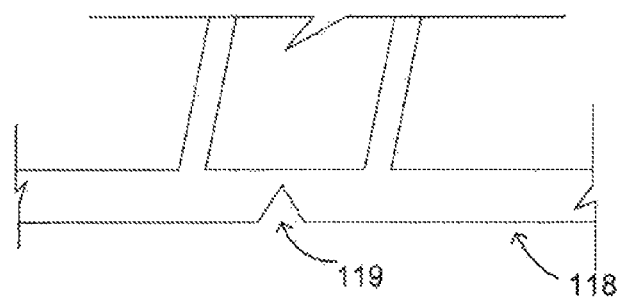
FIG. 6 is a plan view of a portion of a battery grid similar to that shown in FIG. 2 that includes a modified configuration that is intended to restrain the overall growth of the grid due to corrosion.

As shown in FIG. 6, a portion of one of the frame elements may include a notch or cutout. According to an exemplary embodiment as shown in FIG. 6, the bottom frame element 118 may include a notch or cutout 119 that is intended to act as a point of weakness for the frame. When stresses are introduced which result from growth of the grid, the stress may be concentrated at the point of weakness such that the frame breaks at this point. In this manner, the growth of the grid may be interrupted, and the stresses may be redirected within the grid. It should be noted that while notch 119 is shown as extending inward from the outside of frame element 118, according to other exemplary embodiments, the notch may extend from the inside of the frame element. According to various exemplary embodiments, any suitable number of notches or cutouts may be provided at various locations along the sides, top, and/or bottom of the frame.

Figure 7A:
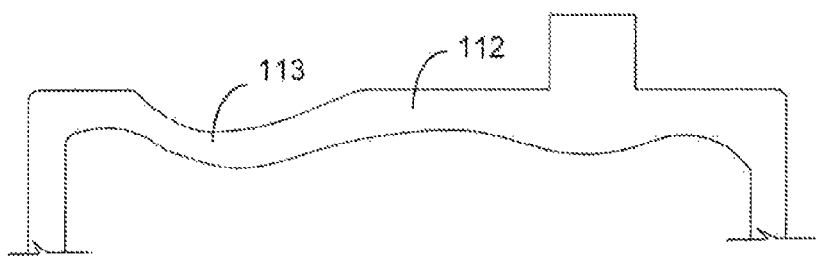
FIG. 7A is a plan view of a portion of a battery grid similar to that shown in FIG. 2 that includes a modified configuration that is intended to restrain the overall growth of the grid due to corrosion.

As shown in FIG. 7A, one of the frame elements may include an indent or depression. For example, according to an exemplary embodiment shown in FIG. 7A, the top frame element 112 of the grid 100 includes an indent 113. The top frame element 112 is effectively bent at this point. When the grid 100 grows in the vertical direction due to corrosion, the indent 113 is pushed upward due to accumulated stresses in the grid. Because the top frame element 112 includes an indent, it will take a longer period of time for the grid to extend upwards to make contact with, for example, a strap connected to grids of opposite polarity. That is, because the top frame element at the point of the indent is not collinear with the rest of the top frame element, growth of the grid will first cause the grid to grow toward the rest of the top frame element; only after this point would the grid continue to grow in the vertical direction. According to various exemplary embodiments, any suitable number of indents may be provided at various locations along the sides, top, and/or bottom of the frame.

Figure 7B:
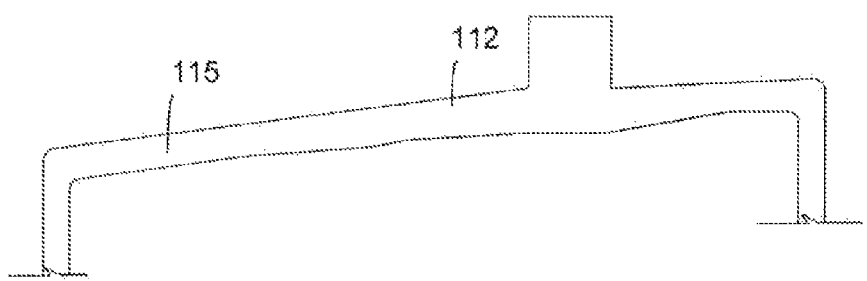
FIG. 7B is a plan view of a portion of a battery grid similar to that shown in FIG. 2 that includes a modified configuration that is intended to restrain the overall growth of the grid due to corrosion.

As shown in FIG. 7B, a portion of the top frame element may be arranged at an angle to the rest of the top frame element. For example, as shown in FIG. 7B, a portion 115 of the top frame element 112 is slanted or angled (e.g., sloped, tapered, etc.) downward. Similar to the indent described with respect to FIG. 7A, the slanted configuration of the top frame element 112 acts to extend the amount of time that the grid must grow in order to contact a strap of opposite polarity. Such a configuration may also act to increase tension in the grid, which may act to counter some of the grid growth.

Figure 8:
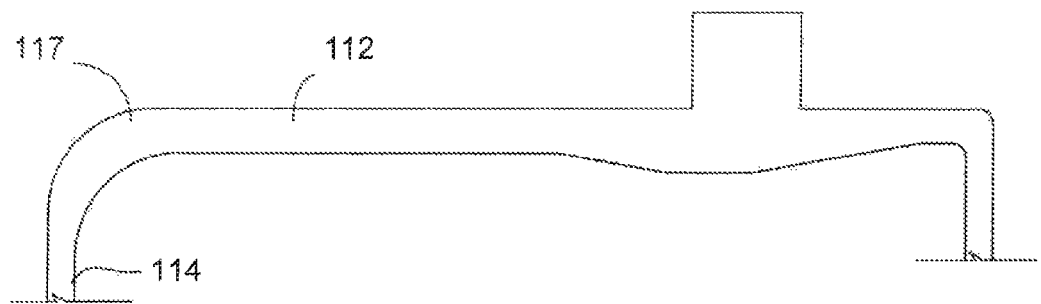
FIG. 8 is a plan view of a portion of a battery grid similar to that shown in FIG. 2 that includes a modified configuration that is intended to restrain the overall growth of the grid due to corrosion.

As shown in FIG. 8, one or more of the corners of the grid may be provided with a rounded shape. For example, according to an exemplary embodiment shown in FIG. 8, a rounded corner 117 is provided which connects the top frame element 112 to the side frame element 114. Such rounded shape may act to redirect the stress and change the direction of the grid growth away from the vertical direction.

Figure 9:
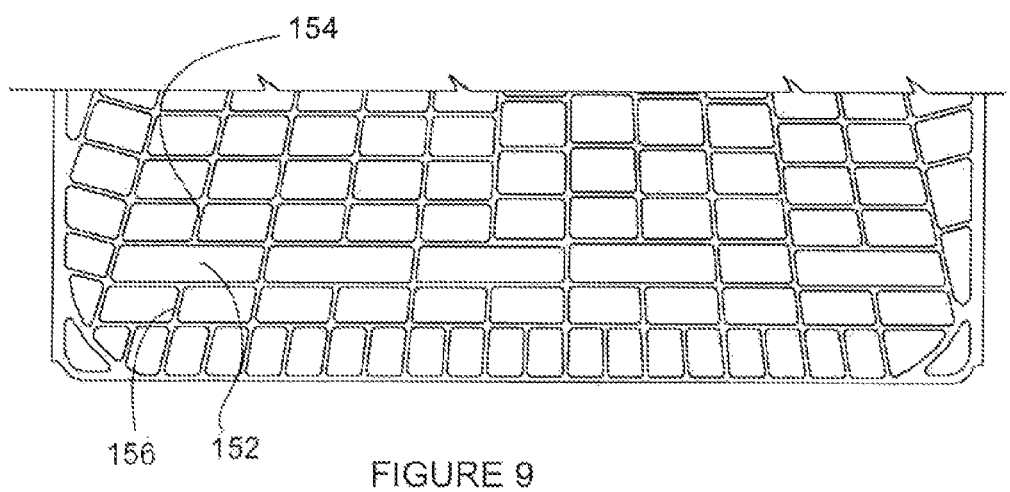
FIG. 9 is a plan view of a portion of a battery grid similar to that shown in FIG. 2 that includes a modified configuration that is intended to restrain the overall growth of the grid due to corrosion.

As shown in FIG. 9, various wires may be removed to form an engineered buffer zone within the grid (similar to a "crumple zone"). In a conventional grid (e.g., such as that shown in FIG. 1), vertical wire members are collinear with each other and extend, for example, from the top frame element to the bottom frame element. As a result, growth of one of the vertical wires is translated to others which are collinear, resulting in an additive growth effect that acts to force the top frame element toward a strap of opposite polarity (as shown, for example, in FIG. 1). According to the exemplary embodiment as shown in FIG. 9, one or more of the vertical wires are removed such that there is an interruption or discontinuity in the grid (e.g., wires 154 and 156 are separated by an open space 152). The open space 152 thus acts as a buffer zone into which the vertical wires may grow (instead of translating their growth in a manner which results in movement of the top frame element of the grid). The open space 152 thus acts to "absorb" the growth in the vertical direction. Any number of engineered buffer zones may be provided at various desired points within the grid.

It should be noted that while the above-described modifications to the grid have been discussed individually, any one or more of such modifications may be utilized in a single grid. For example, both a "weak link" (as shown, e.g., in FIG. 3) and a "distortion" (as shown, e.g., in FIG. 5) may be provided in a single grid. Any other combination of modifications such as those described above may also be utilized in order to manage the growth of the grid.

In operation of a battery using a grid such as that described herein, corrosion of the battery grid material (lead or a lead alloy) will cause growth of the battery grid. Because the grid is constrained at its bottom and sides by the walls of the battery container, growth is directed in the vertical direction toward the top of the grid. By introducing modifications to the grid which are intended to shunt or redirect the growth of the grid, the life of the battery may be extended. For example, by introducing weak points in the grid that are intended to break once a threshold amount of stress is reached, growth may be interrupted or redirected at such points to reduce the growth of the grid in the vertical direction. Any of a variety of modifications may be made to the grid in order to manage the growth of the grid and extend the life of the battery by reducing the occurrence of shorts which result from portions of the grid contacting features electrically coupled to features in the battery having an opposite polarity.

Those reviewing this disclosure will appreciate that various advantages may be obtained using the grid designs described herein. For example, according to an exemplary embodiment, the battery grid provides desired performance characteristics while resists shorting due to grid growth. The battery grid includes features which are intended to act to retard, restrain or restrict growth of the grid due to corrosion. According to an exemplary embodiment, the battery grid includes one or more modifications that are intended to absorb or redirect stresses that may result from growth of the grid (e.g., due to corrosion of the grid). It is intended that such grid designs provide the battery grid, and hence the battery in which it is provided, with an enhanced useful life as compared to conventional battery grids.

It is important to note that the construction and arrangement of the battery grid as shown in the various embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited in the claims. Accordingly, all such modifications are intended to be included within the scope of the present invention as defined in the appended claims. Other substitutions, modifications, changes and omissions may be made in the design, operating conditions and arrangement of the preferred and other exemplary embodiments without departing from the scope of the present inventions.

What is claimed is:

1. A battery grid comprising:
    a frame comprising a top element, a bottom element, a first side element, and a second side element;
    a plurality of wires provided within the frame and defining a plurality of open areas;
    a current collection lug extending from the top element in a first direction; and
    at least one short prevention feature provided in the battery grid that is configured to help prevent a short between the battery grid and a battery component provided near the grid due to growth of the battery grid, wherein the at least one feature is selected from the group consisting of:
    (a) a wire segment having a first portion adjacent a first node, a second portion adjacent a second node, and a weak link provided intermediate the first end and the second end;
    (b) a wire segment having a first generally linear portion adjacent a first node, a second generally linear portion adjacent a second node, and a distortion provided between the first and second generally linear portions; and
    (c) a portion of the top element of the frame that is arranged at an angle to one of the side elements such that the top element and the side element are not perpendicular to each other.

2. The battery grid of claim 1, wherein the short prevention feature reduces the amount of growth of the battery grid in the first direction due to corrosion of the battery grid during the life of the battery.

3. The battery grid of claim 2, wherein the short prevention feature is designed such that one or more of the wires will break after a predetermined amount of growth in the first direction thereby limiting continued growth in the first direction.

4. The battery grid of claim 1, wherein the short prevention feature is configured so as to withstand a greater amount of growth of the battery grid in the first direction before the short is generated.

5. The battery grid of claim 4, wherein the battery grid comprises at least one rounded corner between the top element and at least one of the first and second side elements that redirects forces due to growth of the grid from the first direction toward a second direction.

6. The battery grid of claim 4, wherein the short prevention feature comprises a distortion provided in the top element.

7. The battery grid of claim 6, wherein the top element meets at least one of the first and second side elements at an angle such that at least a portion of the top element is not perpendicular to at least one of the first and second side elements.

8. The battery grid of claim 7, wherein the angle between the top element and at least one of the first and second side elements is greater than ninety degrees.

9. The battery grid of claim 7, wherein the top element comprises a first generally linear portion near the current collection lug, a second generally linear portion near at least one of the first and second side elements and a non-linear portion between the first and second linear portions.

10. The battery grid of claim 9, wherein the non-linear portion comprises an indent provided in the top element.

11. The battery grid of claim 10, wherein the indent comprises a curved portion that extends toward the wires provided within the frame.

* * * * *